United States Patent [19]

Djali

[11] Patent Number: 4,705,478
[45] Date of Patent: Nov. 10, 1987

[54] SUPERIMPOSED TRANSPARENCIES USED IN EDUCATION

[76] Inventor: Reza Djali, 177, Mount Pleasant, Kingswinford, West Midlands DY6 9SS, England

[21] Appl. No.: 714,968

[22] Filed: Mar. 22, 1985

[51] Int. Cl.$^4$ .............................................. G09B 23/04
[52] U.S. Cl. ...................................... 434/215; 434/404
[58] Field of Search ...................... 235/61 B, 61 GM; 273/157 A; 434/211, 212, 213, 214, 215, 216, 404, 88, 96, 153, 155

[56] References Cited

U.S. PATENT DOCUMENTS

| | | | |
|---|---|---|---|
| 1,170,537 | 2/1916 | Holmes | 434/153 X |
| 2,520,347 | 8/1950 | Talcott | 434/404 X |
| 3,021,058 | 2/1962 | Horton | 235/61 B |
| 3,377,718 | 4/1968 | Savin | 434/215 |
| 4,282,655 | 8/1981 | Tinman | 283/1 A X |

OTHER PUBLICATIONS

Cenco Teacher Guide No. 5, "Angle Measurement", ©1965.
Physics Research Labs Publication entitled "Transparent Visual-Aids", pp. 1, 2, 3 only.

Primary Examiner—William H. Grieb

[57] ABSTRACT

A visual aid in which a background sheet, FIG. 1, features a diagram. It is desired to demonstrate that one part of the diagram, in this case the angle ACD can fit exactly on another part, in this case the angle ABC. The two parts are jointly used as the basis of a geometrical construction to locate the position of the center of rotation P. A transparent sheet (FIG. 2) is laid over the background sheet. The point Q is marked corresponding to P and the two sheets are pivotally assembled through P and Q. The relevant part of the background diagram, in this case the angle ACD is now copied onto the overlay sheet, in this case angle G. Pivotal movement of the overlay sheet will allow angle G to be alternately superimposed on angles ACD or ABC. The tongue T, fits in the slot S to limit the pivotal movement.

10 Claims, 6 Drawing Figures

SUPERIMPOSED TRANSPARENCIES USED IN EDUCATION

BACKGROUND OF THE INVENTION

Sheets of transparent material carrying written or diagrammatic information are commonly referred to as transparencies. They are widely used in education for projection through an overhead projector either singly or superimposed. They are also used in direct demonstrations without a projector for superimposing added features to opaque background sheets.

The usual method of ensuring the accurate positioning of the superimposed features is to hinge the overlay sheets to the background sheet like the pages of a book.

Hinging in this way is not suitable for many applications where it is necessary to demonstrate that a single superimposed feature is capable of fitting at two distinct positions on the background. For these applications the overlay sheet is not fixed to the background sheet in any way. The demonstration is achieved by sliding the overlay sheet over the background sheet, freehand and stopping at the two correct positions. This freehand operation is very awkward to perform accurately.

SUMMARY OF THE INVENTION

The object of this invention is to overcome the awkwardness by replacing the freehand movement. Pivotal assembly of the two sheets will allow the superimposed feature to move over the main diagram in a circular path, but will not in general guarantee that the path contains the two desired positions.

According to the invention the two sheets are pivotally assembled using a unique location for the pivot point that will allow the superimposed feature to assume either of the two desired positions. Furthermore, the invention provides means of stopping the movement at the two correct positions.

BRIEF DESCRIPTION OF THE DRAWINGS

FIG. 1 shows the background sheet.
FIG. 2 shows the overlay sheet.
FIG. 3 shows a sub assembly of a background sheet and two overlay sheets
FIG. 4 shows the same sub assembly in its alternative position
FIG. 5 shows a top cover sheet
FIG. 6 shows the frame.

DESCRIPTION OF THE PREFERRED EMBODIMENTS

Figure 1:
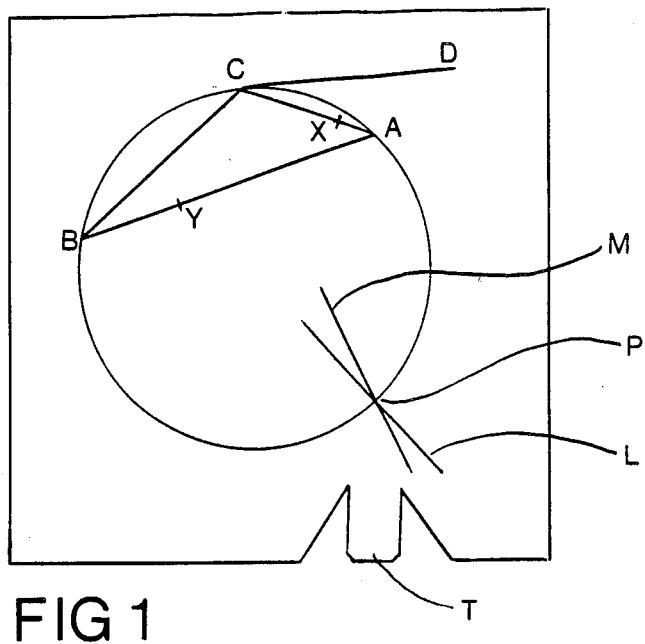
FIGS. 1 and 2 refer to the first embodiment thus.
Figure 2:
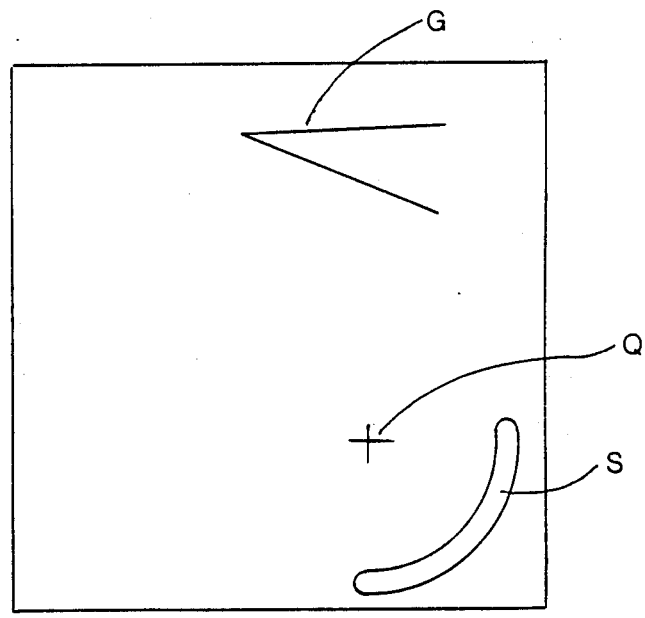

In FIG. 1 the background sheet features the diagram of a well-known geometrical theorem in which the equality of angles ABC and ACD is to be demonstrated. On the overlay sheet, FIG. 2, is drawn an angle G. It is desired that this angle G should be capable of coniciding alternately with the angle ABC or the angle ACD when the two sheets are pivotally assembled.

The angles ABC and ACD in FIG. 1 are identical in size and can be used jointly as the basis of a geometrical construction to locate a unique point known as the centre of rotation. One of the many constructions to locate the centre of rotation is as follows:

Referring to FIG. 1, the point B in the angle ABC corresponds to the point C in the angle ACD. Using one such pair of corresponding points as B and C, the perpendicular bisector L of BC is drawn. Using another such pair of corresponding points such as X and Y, (BX=CY) the perpendicular bisector M, of XY is drawn. Where the lines L and M cross each other defines the unique point P, suitable for pivotal mounting that will allow the angle G to coincide at will either with ABC or ACD. The geometrical construction lines L and M are only aids to the description and location of the point P. They need not appear on the finished product. In quantity production only the tooling will be based on the geometrical methods described. The unique pivotal point of the overlay sheet is Q. This point is found by using P as a guide when the two sheets are accurately superimposed.

A part of the background sheet is configurated to form the tongue T. The overlay sheet has a slot S. The two sheets are now pivotally assembled through P and Q ensuring that the tonque T fits in the slot S. The size of the slot defines the limits of the pivotal movement.

A second embodiment of the invention, setting forth the best contemplated mode will now be described by way of example with reference to FIGS. 3, 4, 5 and 6 of the accompanying drawings.

Figure 3:
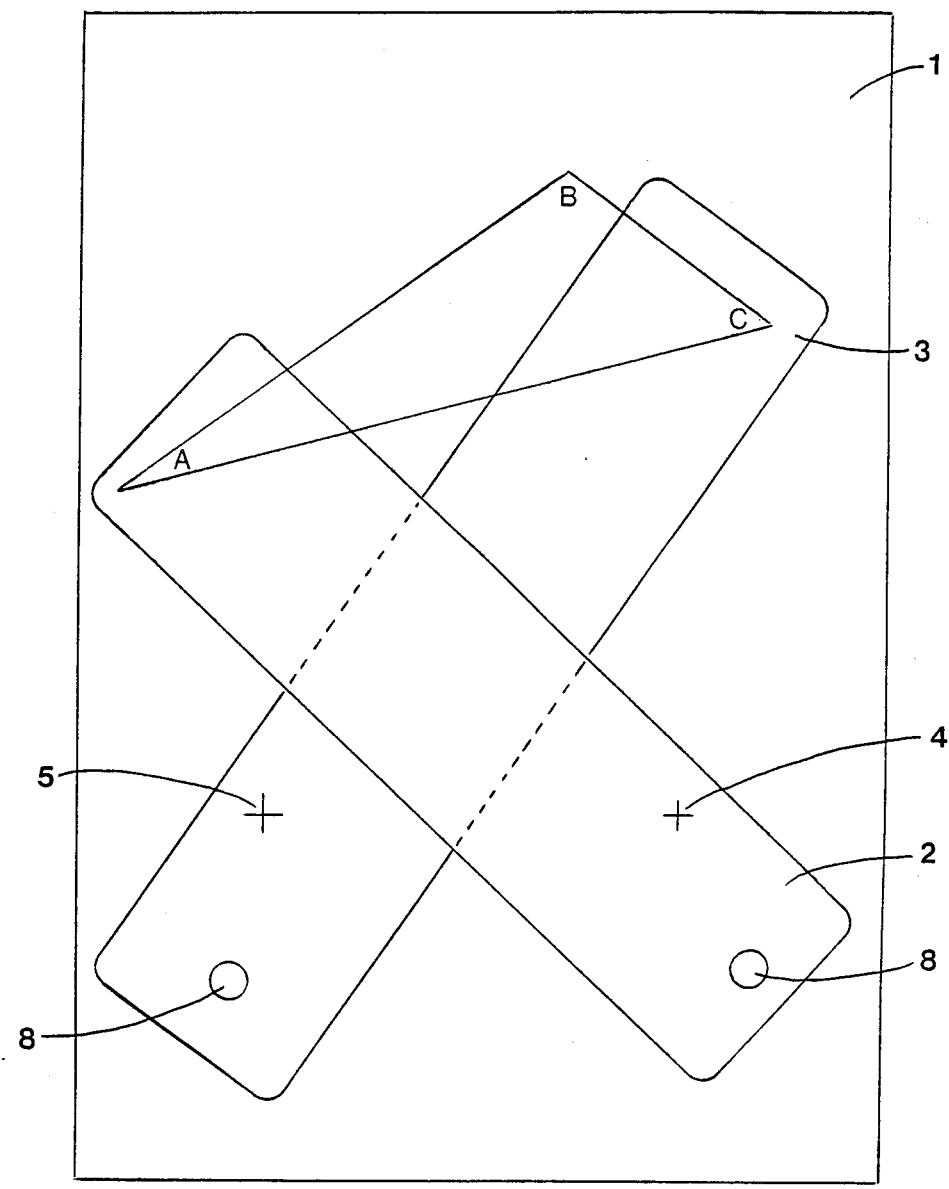
FIGS. 3, 4, 5 and 6 refer to the second embodiment thus.
Figure 4:
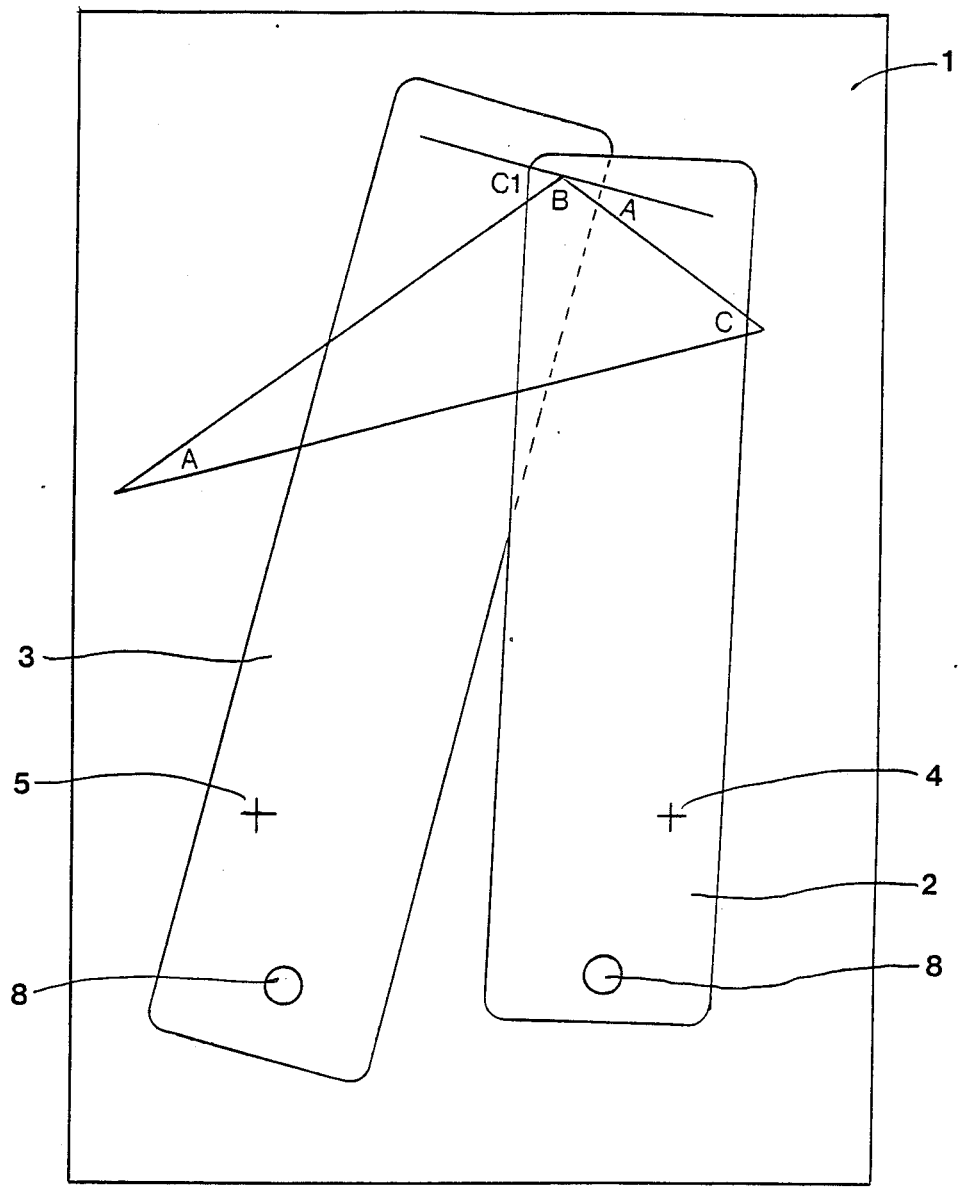

This embodiment is an aid to demonstrating that the sum of interior angles of any triangle is 180 degrees. In FIG. 3 a background sheet 1, features a triangle ABC. Two transparent sheets 2 and 3 feature copies of angles A and C respectively. It is intended that the copy of angle A on the transparent sheet 2 be capable of fitting at will either exactly superimposed on A (FIG. 3) or at the position A1 (FIG. 4). For this purpose the location of the unique pivot point 4, is determined by the method described in the first embodiment.

Similarly it is intended that the copy of angle C on the transparent sheet 3, be capable of fitting at will either exactly superimposed on C (FIG. 3) or at the position C1 (FIG. 4). For this purpose the location of the unique pivot point 5, is determined by the method described in the first embodiment.

Figure 5:
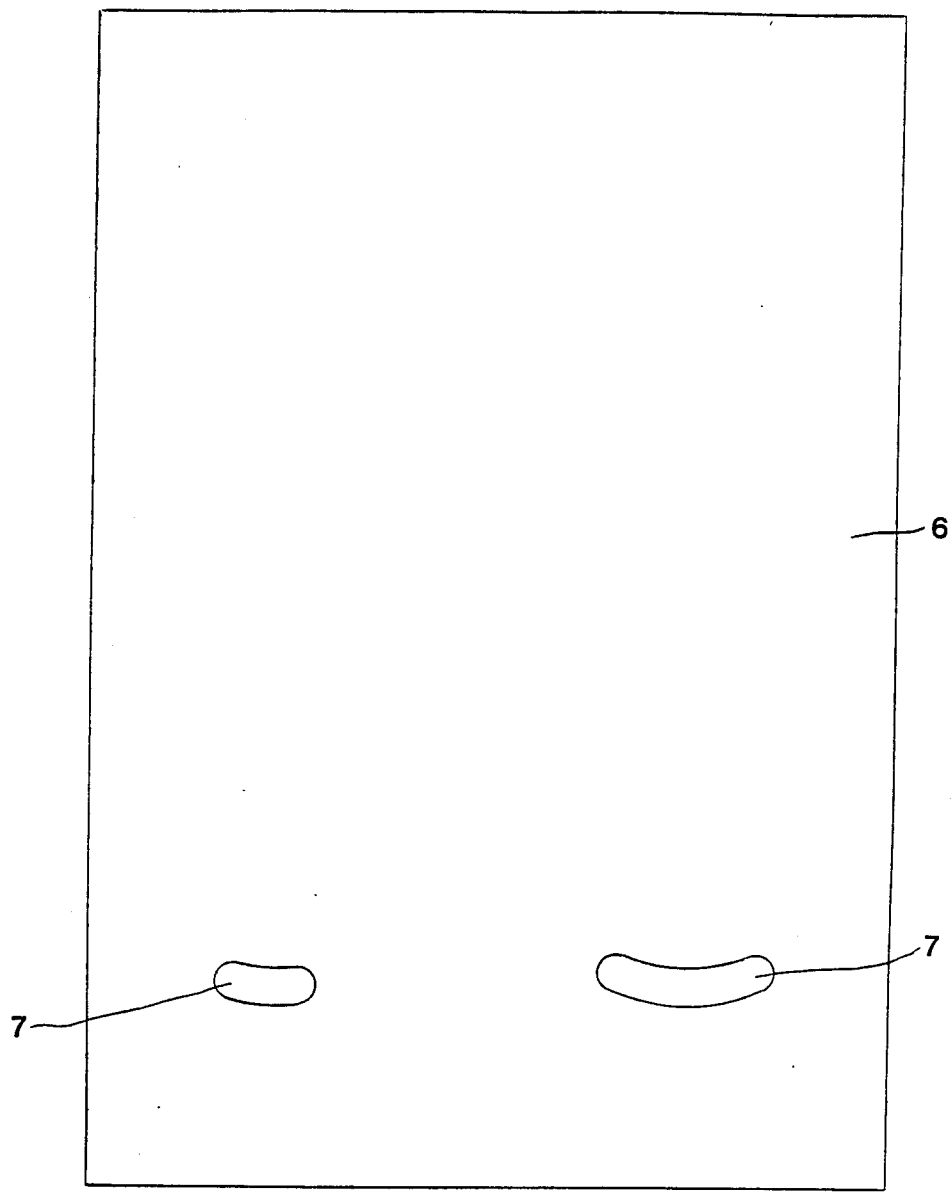
Figure 6:
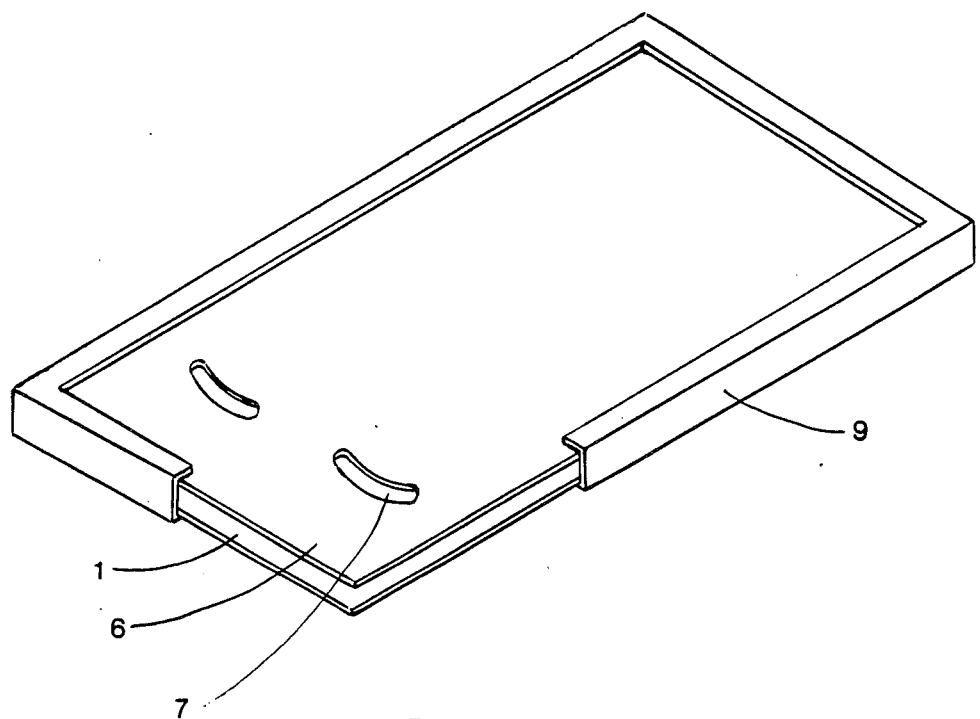

A transparent top sheet 6 equal in size to the background sheet 1, is shown in FIG. 5. The top sheet 6, will then be fitted over the sub assembly of sheets 1, 2 and 3. The top sheet has curved slots 7, to give access to the operating buttons 8, fixed to the transparent sheets 2 and 3. Furthermore, the curved slots 7, confine the pivotal movement, thereby providing mechanical means of stopping the movement at the desired positions. The final assembly is then fitted in a suitable frame (FIG. 6) for protection, enhancement and product appeal. In FIG. 6 a part of the frame 9, is removed for clarity.

I claim:
1. A device for animated demonstrations wherein a planar member features a diagram and a second planar member, pivotally assembled to the first, features a copy of a specific part of said diagram; the pivotal freedom of said two members relative to each other enabling said copy to move in a curved path over the surface of said diagram; said curved path containing two locations crucial to the demonstration; one said crucial location being the exact coincidence of said copy with said specific part of the diagram.

2. A device according to claim 1 wherein said diagram relates to a geometrical theorem.

3. A device according to claim 2 wherein said copy is an angle.

4. A device according to claim 3 wherein the other of said two crucial locations is the exact coincidence or adjacency of said copy with one angle of said diagram.

5. A device according to claim 2 wherein said geometrical theorem is the sum of interior angles of a triangle being 180 degrees.

6. A device according to claim 2 wherein said geometrical theorem is the alternate segment theorem.

7. A device embodying a plurality of pivotal movements each according to claim 1.

8. A device according to claim 1 wherein means are provided to stop the pivotal movements at said two crucial locations.

9. A device according to claim 1 to which further transparent sheets are added for protection, rigidity or finished product appeal.

10. A device according to claim 1 set in a frame.

* * * * *